United States Patent
Doyle

(10) Patent No.: US 12,553,518 B2
(45) Date of Patent: Feb. 17, 2026

(54) RING SEAL WITH TROUGH

(71) Applicant: Microflex Technologies Inc, Orange, CA (US)

(72) Inventor: Gregory Doyle, Villa Park, CA (US)

(73) Assignee: Microflex Technologies, Inc., Orange, CA (US)

(*) Notice: Subject to any disclaimer, the term of this patent is extended or adjusted under 35 U.S.C. 154(b) by 0 days.

(21) Appl. No.: 18/790,158

(22) Filed: Jul. 31, 2024

(65) Prior Publication Data

US 2025/0043893 A1 Feb. 6, 2025

Related U.S. Application Data

(60) Provisional application No. 63/517,048, filed on Aug. 1, 2023.

(51) Int. Cl.
| | |
|---|---|
| *F16J 15/08* | (2006.01) |
| *F16J 15/06* | (2006.01) |
| *F16L 23/20* | (2006.01) |

(52) U.S. Cl.
CPC ........... *F16J 15/0887* (2013.01); *F16J 15/08* (2013.01); *F16L 23/20* (2013.01); *F16J 15/062* (2013.01)

(58) Field of Classification Search
CPC ........ F16J 15/061; F16J 15/08; F16J 15/0881; F16J 15/0887; Y10S 285/917; F16L 23/20; F16L 17/08
See application file for complete search history.

(56) References Cited

U.S. PATENT DOCUMENTS

| | | | |
|---|---|---|---|
| 3,137,509 A | 6/1964 | Kazienko | |
| 3,713,660 A | 1/1973 | Luthe | |
| 4,114,908 A * | 9/1978 | Nicholson | F16J 15/0881 277/612 |
| 4,477,087 A | 10/1984 | Sutter, Jr. et al. | |
| RE34,144 E | 12/1992 | Leigh | |
| 5,240,263 A * | 8/1993 | Nicholson | F16J 15/0893 219/137 R |
| 5,354,072 A | 10/1994 | Nicholson | |

(Continued)

FOREIGN PATENT DOCUMENTS

| | | |
|---|---|---|
| JP | 2004176835 A | 6/2004 |
| JP | 2013221525 A | 10/2013 |
| WO | 2011024889 A1 | 3/2011 |

OTHER PUBLICATIONS

International Search Report for PCT/US2015/030089 mailed Aug. 10, 2015; 6 pages.

(Continued)

*Primary Examiner* — Nicholas L Foster
(74) *Attorney, Agent, or Firm* — Fitch, Even, Tabin & Flannery LLP

(57) ABSTRACT

A ring seal includes an annular body defining an axial hole therethrough for fluid passage in an axial direction and having a radial plane that is perpendicular to the axial direction. An axial side of the ring seal includes deformable annular protrusions extending from the annular body in an axial direction to first and second apexes, which are configured to deform upon engagement with a first planar sealing surface and define a trough therebetween to engage a first annular rounded sealing protrusion or ring. So configured, the ring seal can seal two different types of flow components.

20 Claims, 4 Drawing Sheets

(56) References Cited

U.S. PATENT DOCUMENTS

| | | | | |
|---|---|---|---|---|
| 5,720,505 | A | 2/1998 | Ohmi | |
| 6,286,839 | B1 | 9/2001 | Mitsui et al. | |
| 6,357,759 | B1 | 3/2002 | Azuma et al. | |
| 6,357,760 | B1 | 3/2002 | Doyle | |
| 6,409,180 | B1 | 6/2002 | Spence | |
| 6,688,608 | B2 | 2/2004 | Doyle | |
| 6,769,697 | B1 | 8/2004 | Ishikawa | |
| 6,945,539 | B2 | 9/2005 | Whitlow | |
| 7,140,647 | B2 | 11/2006 | Ohmi et al. | |
| RE39,973 | E | 1/2008 | Spence | |
| 7,857,322 | B2 * | 12/2010 | Fietz | F16J 15/3268 277/649 |
| 8,083,267 | B2 | 12/2011 | Itoi | |
| 8,191,901 | B2 * | 6/2012 | Crawford | F16L 19/0218 277/609 |
| 8,256,115 | B2 | 9/2012 | Itoi | |
| 8,662,504 | B2 | 3/2014 | Kariya | |
| 8,695,987 | B2 * | 4/2014 | Crawford | F16L 19/0218 277/603 |
| 9,074,686 | B2 * | 7/2015 | Doyle | F16J 15/022 |
| 9,470,313 | B2 * | 10/2016 | Koyanagi | F16L 23/20 |
| 9,739,378 | B2 | 8/2017 | Vu | |
| 9,845,875 | B2 | 12/2017 | Doyle et al. | |
| 9,869,409 | B2 | 1/2018 | Vu | |
| 9,970,547 | B2 | 5/2018 | Vu | |
| 10,422,429 | B2 | 9/2019 | Vu | |
| 10,533,662 | B2 | 1/2020 | Vu | |
| 10,982,768 | B2 | 4/2021 | Vu | |
| 11,255,433 | B2 | 2/2022 | Vu | |
| 11,300,205 | B2 | 4/2022 | Vu | |
| 11,732,803 | B2 * | 8/2023 | Kashihara | F16J 15/0887 277/549 |
| 11,781,651 | B2 | 10/2023 | Vu | |
| 11,796,089 | B2 | 10/2023 | Vu | |
| 11,802,621 | B2 | 10/2023 | Sato | |
| 12,055,218 | B2 * | 8/2024 | Vu | F16J 15/0806 |
| 12,287,033 | B2 * | 4/2025 | Nakano | F16J 15/106 |
| 2002/0063396 | A1 | 5/2002 | Doyle | |
| 2002/0153669 | A1 | 10/2002 | Caplain et al. | |
| 2002/0153673 | A1 | 10/2002 | Caplain et al. | |
| 2003/0164594 | A1 | 9/2003 | Whitlow et al. | |
| 2004/0188955 | A1 | 9/2004 | Takahiro | |
| 2005/0035557 | A1 * | 2/2005 | Crawford | F16L 23/20 277/609 |
| 2006/0055122 | A1 | 3/2006 | Itoi et al. | |
| 2008/0277879 | A1 | 11/2008 | Pradelle | |
| 2009/0015010 | A1 | 1/2009 | Itoi | |
| 2009/0315274 | A1 * | 12/2009 | Wu | F16L 17/08 277/608 |
| 2011/0121515 | A1 * | 5/2011 | Crawford | F16L 23/20 277/630 |
| 2012/0139235 | A1 | 6/2012 | Koyanagi et al. | |
| 2013/0187343 | A1 | 7/2013 | Tohdoh | |
| 2013/0264778 | A1 * | 10/2013 | Doyle | F16L 23/20 29/428 |
| 2014/0225367 | A1 | 8/2014 | Vu | |
| 2015/0069721 | A1 | 3/2015 | Okafuji et al. | |
| 2015/0300495 | A1 | 10/2015 | Vu | |
| 2015/0330510 | A1 | 11/2015 | Doyle | |
| 2017/0356549 | A1 * | 12/2017 | Vu | F16J 15/3236 |
| 2018/0259070 | A1 * | 9/2018 | Vu | F16J 15/0887 |
| 2018/0259071 | A1 * | 9/2018 | Vu | F16J 15/3236 |
| 2018/0306322 | A1 * | 10/2018 | Vu | F16J 15/3236 |
| 2020/0182354 | A1 * | 6/2020 | Vu | F16J 15/0881 |
| 2020/0191271 | A1 * | 6/2020 | Vu | F16J 15/3236 |
| 2020/0240519 | A1 | 7/2020 | Sato | |
| 2021/0310560 | A1 * | 10/2021 | Vu | F16J 15/3236 |
| 2022/0154828 | A1 * | 5/2022 | Kashihara | F16J 15/0887 |
| 2023/0054248 | A1 * | 2/2023 | Brand | F16J 15/56 |
| 2023/0148383 | A1 * | 5/2023 | Nakano | F16J 15/106 277/602 |
| 2024/0068568 | A1 * | 2/2024 | Vu | F16J 15/3236 |
| 2024/0141994 | A1 | 5/2024 | Doyle | |
| 2025/0043865 | A1 * | 2/2025 | Vu | F16J 15/3236 |

OTHER PUBLICATIONS

Written Opinion of the International Searching Authority for PCT/US2015/030089 mailed Aug. 10, 2015; 7 pages.

* cited by examiner

RING SEAL WITH TROUGH

CROSS-REFERENCE TO RELATED APPLICATIONS

This application claims benefit of U.S. Provisional Application No. 63/517,048, filed Aug. 1, 2023, which is hereby incorporated herein by reference in its entirety.

FIELD

This disclosure relates to seals and gaskets for forming a fluid tight seal joint between opposed flow component ports.

BACKGROUND

Ring seals are typically annularly shaped, defining an axially aligned hole for fluid (liquid or gas) passage, two axially opposed end surfaces, a radial inner surface, and a radial outer surface. A simplistic ring seal has planar end surfaces and smooth circular radial inner and outer surfaces that define the inner diameter (ID) and outer diameter (OD) of the ring seal. It is common practice in the industry, however, to utilize seals having different radial cross-sections to obtain varying sealing capabilities for different fluid flow environments. Ring seals are typically formed from a metal such as nickel, stainless steel, and nickel alloys such as C22.

Ring seals are typically designed for interfacing with a specific port type. The opposed sealing sides or surfaces of the ring seal are each configured to engage a port of a flow component to form a fluid tight seal between the end surface and the flow component. A commonly used ring seal is a "C seal" that has a radial cross-section of a "C" shape. The end surfaces of C seals engage and compress against a planar surface of a port of a flow component to form a fluid tight seal therebetween. Other C seals include a ridge or extension protruding axially from the end surface to aid in forming a fluid tight seal with the port of the flow component.

Another ring seal type known in the industry is a "W" seal. A typical "W" seal has planar opposed sealing surfaces. The W seal is positioned between two coupling members that have annular projections, respectively, extending therefrom. The planar sealing surfaces engage the annular projections to form a fluid tight seal between the W seal and the coupling members.

A problem with the existing ring seals is that the ring seals are only designed for use with a specific port type. For example, a C seal can only be used with a C-type port of a flow component, and a W seal can only be used with a W-type port. Problems arise when, for example, the port of a flow component on one side of the ring seal is C-type and the port of the flow component on the other side of the ring seal is a W-type. Some have attempted to solve this problem by creating a ring seal having one end surface designed to interface with a C-type port and the opposite end designed to interface with a W-type port. A shortcoming of such a ring seal is that one must be conscious of the orientation of the ring seal when positioning it between the flow components of different port types. Positioning the ring seal in an inverted orientation may cause damage to the flow components or ports thereof. Another shortcoming is that this ring seal cannot be used between flow components with the same port type, thus requiring a user to have a variety of ring seals on hand based on the port types of the flow components being joined together.

Some attempts to create port neutral ring seals have been attempted, for example, having identical sealing surface designs suitable for both C-type and W-type ports. One such ring seal with axial protrusions, however, may create scratches on the fluid port surface of C-type ports. Other problems have arisen including potential misalignment problems with W-type ports leading to seal failure.

Figure 1:
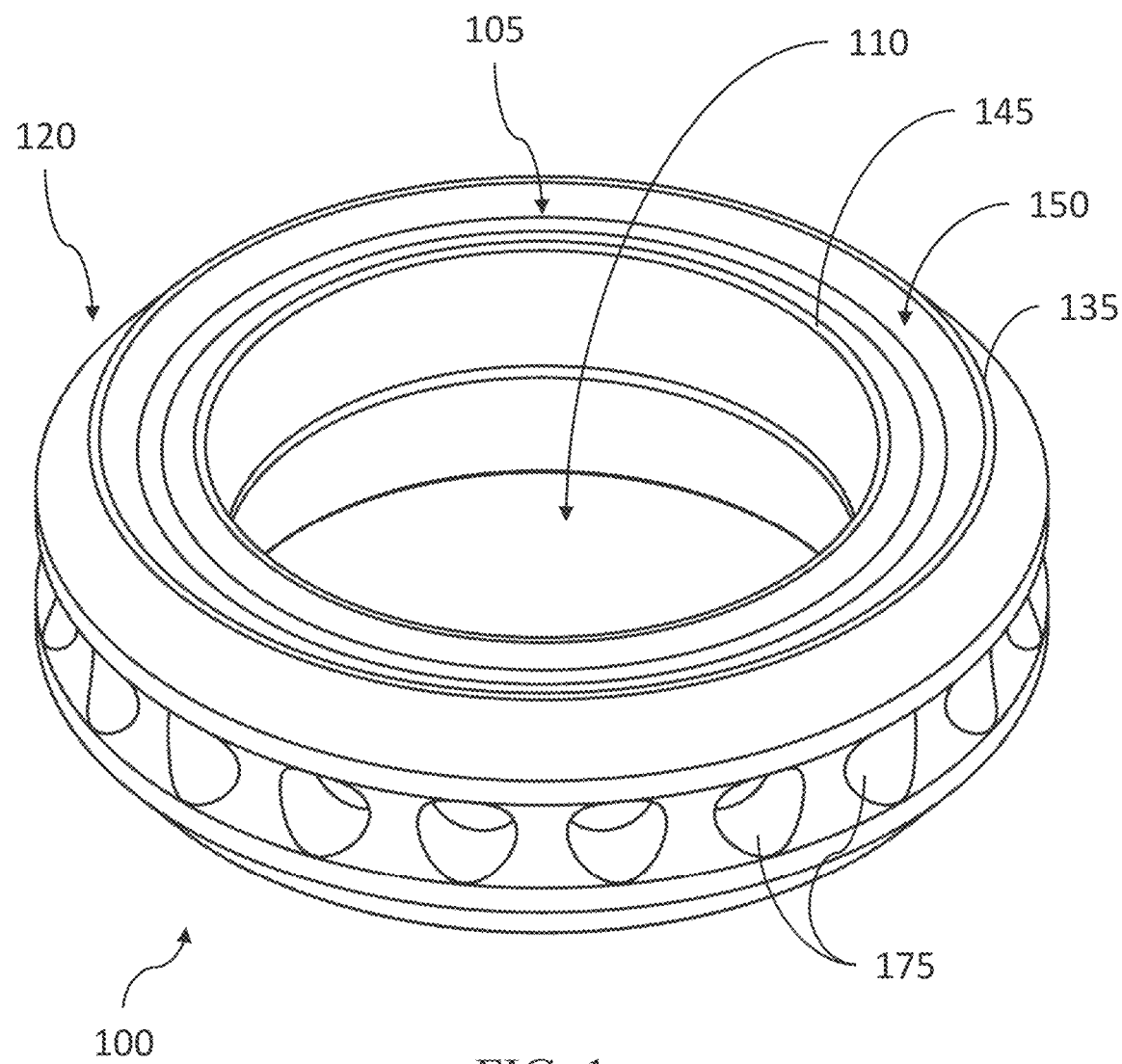
FIG. 1 is a top perspective view of a ring seal according to various embodiments.
Figure 2:
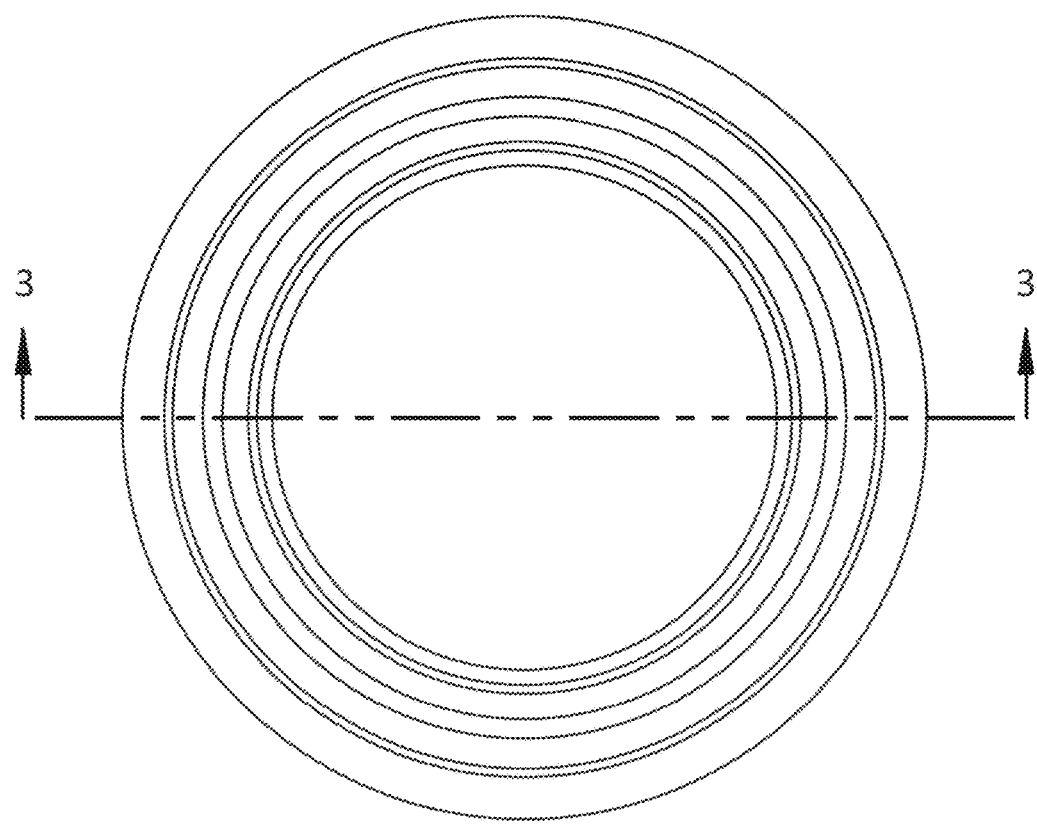
FIG. 2 is a top plan view of the ring seal of FIG. 1.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present disclosure. Also, common but well-understood elements that are useful or necessary in a commercially feasible embodiment are often not depicted to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Ring seals are disclosed herein that may be positioned between opposed flow component sealing ports to create a fluid tight seal between the opposed sealing ports. The ring seals create a fluid tight passageway from the first flow component to the second flow component. The ring seals disclosed herein include a sealing surface designed to be used in conjunction with at least two different sealing port types (e.g., C-seal type and W-seal type). Optionally, the ring seal may be symmetrical in that both sealing surfaces of the ring seal may be used in conjunction with multiple sealing port types. For example, the sealing surfaces of the ring seals may be used to seal against either a C-seal type port or a W-seal type port. Thus, a single ring seal may be used to seal the interface between two C-type ports, two W-type ports, or one C-type port and one W-type port. A user may thus use this ring seal regardless of whether the upper or lower sealing port is C- or W-type because both sides of the ring seal are compatible with either port type.

Referring now to the drawings, wherein identical numerals indicate the same elements throughout the figures, FIGS. 1-6 illustrate an example ring seal 100 in accord with these teachings. The ring seal 100 is designed for sealing opposed flow component sealing ports defining a fluid flow path. The ring seal 100 includes an annular seal body 105 that defines an axial hole 110 therethrough for fluid passage in an axial direction illustrated by the arrow 115 in FIG. 3. The annular body 105 has a radial plane 117 perpendicular to the axial direction 115.

The example ring seal 100 includes opposing first and second sealing sides 120 and 120' on the axial ends 125 and 125' of the annular seal body 105. The sealing sides 120 and 120' are brought into engagement with a sealing port of a flow component to create a fluid tight seal between sealing port of the flow component and the sealing side 120 and 120'. Thus, when both the first sealing side 120 and the second sealing side 120' engage sealing ports of a flow component such that a fluid tight seal is formed, the fluid flows through the axial hole 110 from one flow component and into the other flow component without leaking the fluid between the flow components.

Figure 3:
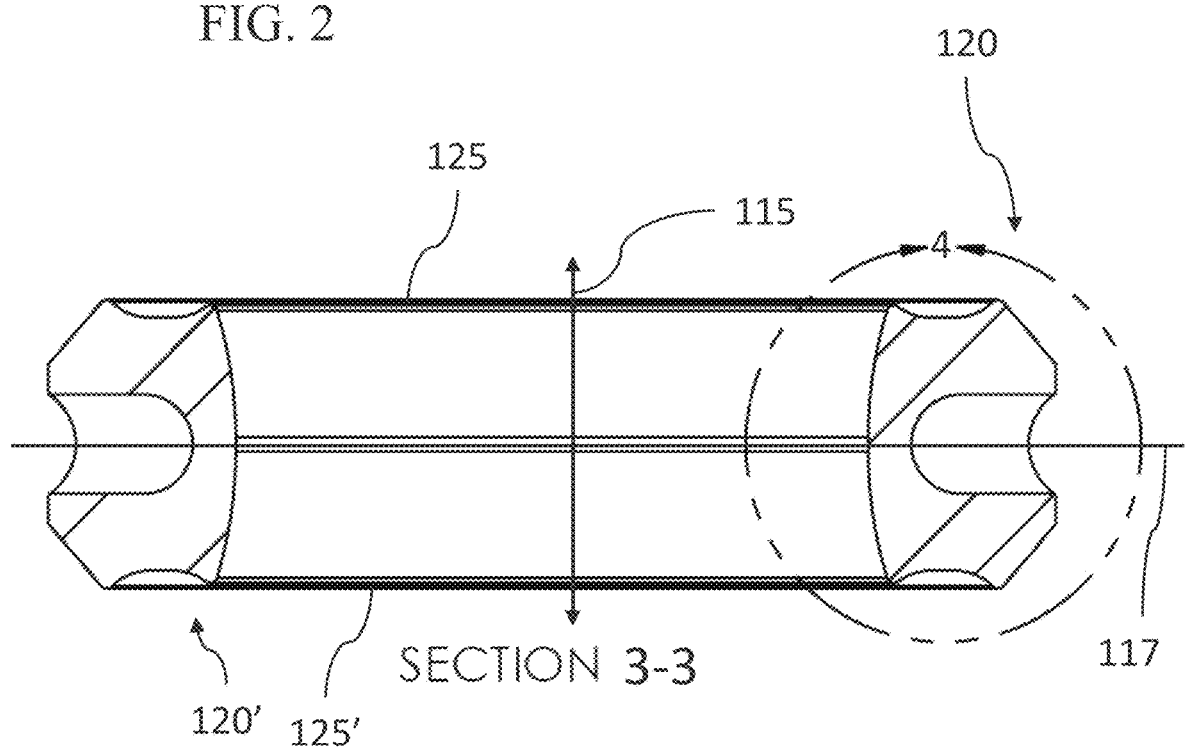
FIG. 3 is a cross-sectional view of the ring seal of FIG. 1 taken along lines 3-3 of FIG. 2.
Figure 4:
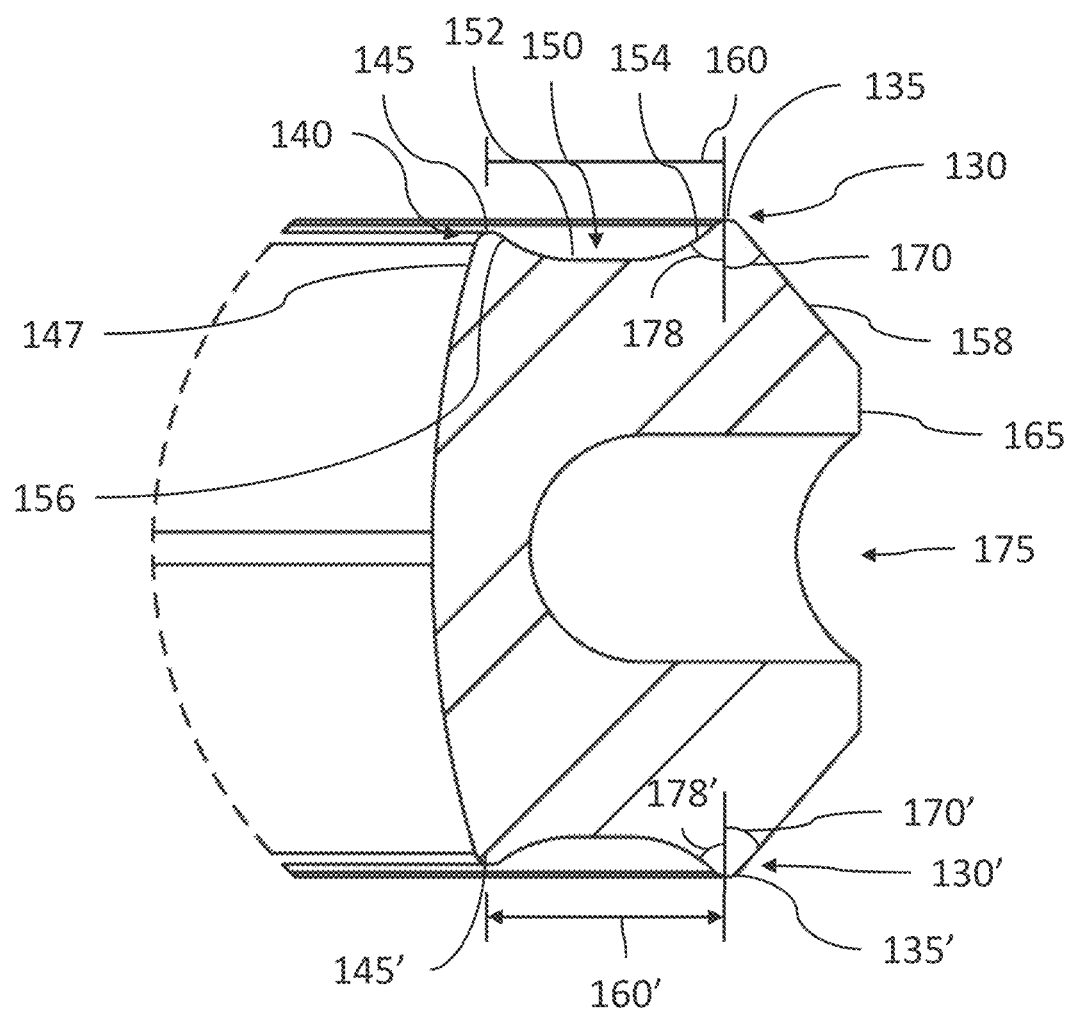
FIG. 4 is a closeup view of a portion of the cross-sectional view of the ring seal of FIG. 3.

Referring to FIG. 4, which depicts the call out section 4 from FIG. 3, the first sealing side 120 includes a first deformable annular protrusion 130 extending from the annular body 105 in an axial direction to a first apex 135. The sealing side 120 also includes a second deformable annular protrusion 140 extending from the annular body 105 in an axial direction to a second apex 145. The first and second deformable annular protrusions 130 and 140 are both configured to deform upon engagement with a first planar sealing surface. For example, if the first sealing side 120 is used to engage the substantially planar sealing surface of a C-type port of a flow component to form a fluid tight seal (e.g., a C seal) between the first sealing side 120 and the sealing port of the flow component, the annular protrusions 130 and 140 deform against the flat surface to form the seal.

The first sealing side 120 further includes a trough 150 defined between the first deformable annular protrusion 130 and the second deformable annular protrusion 140. The trough 150 extends around the first sealing side 120 and is configured to engage with a first annular rounded sealing ring. For instance, a distance 160 between the first apex 135 and the second apex 145 is set to engage the sides of a typical protrusion of a W-type port as known in the art. Such a distance may be, for example, between 0.023 inches and 0.043 inches, preferably about 0.029 inches. The trough's 150 diameter (as measured from a point equidistant between the first apex 135 and the second apex 145) is limited only by the port size. In one example, the trough 150 is sized to engage the W-type port's annular protrusion, by having a diameter as measured at a point equidistant between the first apex 135 and the second apex 145 of between 0.216 and 0.234 inches. An example diameter size for the trough 150 is 0.219 inches In the illustrated example, the ring seal 100 has an outer diameter of 0.282 inches, an inner diameter (i.e., diameter of the most narrow portion of axial hole 110) of 0.180 inches, and the first apex 135 has a diameter of 0.249 inches while the second apex 145 has a diameter of 0.210 inches.

In one example, the second apex 145 and the second deformable annular protrusion 140 border the axial hole 110 such that an inner diameter surface 147 defining a portion of the axial hole 110 forms one side of the second deformable annular protrusion 140. The first apex 135 extends in an axial direction slightly farther than the second apex 145, by about 0.002 to 0.004 inches. This small difference in relative heights in the axial direction reduces the likelihood of damage to the second deformable annular protrusion 140 during handling allowing the second deformable annular protrusion 140 to deform and create an additional sealing surface, increasing the likelihood of forming a complete fluid tight seal if the first deformable annular protrusion 130 is damaged.

So configured, the ring seal 100 can be placed on a W-type port, and the trough 150 will naturally align to the W-type port's ring shaped protrusion, facilitating easy alignment during the process of creating the seal. For example, the ring seal 100 may be placed "on top" of a W-type port, and the trough 150 will facilitate alignment with the W-type port's annular protrusion, reducing misalignment issues. To facilitate sealing a standard W-type port, the trough's 150 depth below the first deformable annular protrusion 130 is between 0.003 and 0.008 inches. Thus, during compression, the W-type port's protrusion presses into the trough 150, creating sealing surfaces at one or any combination of the trough's base 152, along the first rising surface 154 to the first apex 135, and the second rising surface 156 to the second apex 145. At least one of the trough's base 152, the first rising surface 154, and/or the second rising surface 156 may deform against the W-type port's ring seal, thereby providing several elements to create a fluid tight seal.

In the illustrated example, the first apex 135 transitions to an outer extension surface 158 extending radially away from the axial hole 110 and an inner rising surface 154 extending radially towards the axial hole 110. In other words, the outer extension surface 158 extends from the first apex 135 in the radially outward direction to the outer surface 165 that forms the outer diameter of the ring seal 100. The outer extension surface 158 may be, for example, a frustoconical surface about the circumference of the ring seal 100 and preferably slopes at an angle 170 relative to the direction of the axial fluid flow near the same as the angle 178 of the initial slope of the first rising surface 154 away from the first apex 135 going into the trough 150. For example, the outer extension surface 158 may extend adjacent to the first apex 135 at an angle of about 20-60 degrees relative to the axial plane as an example range. In one specific example, the outer extension surface 158 extends from the first apex 135 at an angle of about 40 degrees relative to the axial plane. Similarly, the inner rising surface 154 adjacent to the first apex 135 extends at an angle of about 20-60 degrees relative to the axial plane as an example range, although the inner rising surface 154 may change slope beyond this range as it extends to the bottom of the trough 150. This range of angles on either side adjacent to the first apex 135 results in that during compressing with a flat sealing surface (e.g., a C-type port), the first apex 135 deforms without significant slippage along the sealing surface. For example, it has been found that an apex with one side sloping at about 45 degrees relative to the axial fluid flow and the other sloping at about a 70 degree angle results in slippage of the apex along the sealing surface during compression, potentially scratching the flow component's sealing surface and potentially compromising the resulting sealing effect.

When the annular protrusion 130 is forced against a planar sealing surface (e.g., as shown FIGS. 5 and 6), the annular protrusion 130 deforms sufficiently such that the inner extension surface 147 also engages the sealing surface.

In the embodiment shown, the sealing side 120' on the second axial end 125' is a mirror image of the sealing side 120 reflected over the radial plane and functions identically to the sealing side 120. As shown, in FIGS. 3 and 4, the example sealing ring 100 is symmetrical about the radial plane. Features of sealing surface 120' that correspond to features described in relation to sealing surface 120 are indicated with a prime ('). For example, a feature like the first apex 135 of the sealing surface 120 that corresponds to a feature of the sealing surface 120' is indicated by 135'. While the illustrated ring seal includes two multi-port type compatible sealing surfaces, in other embodiments, the ring seal 100 may have only one such sealing surface while the other surface has a different form, for example, that is only configured to seal against a single sealing port type as known in the art.

The ring seal 100 may optionally further include a plurality of bores 175 extending radially inward from the outer surface 165. The plurality of bores 175 may take any number of configurations. For example, preferably, the bores 175 are constructed by drilling radially from the ring seal's radial outer surface toward the ring seal's center to minimize costs and reduce any difficulties in manufacturing. Bores 175 constructed in this manner have a circular cross-section. For simplicity, the bores 175 are illustrated as having a circular cross-section though the bores may have cross-sections other shapes without departing from the spirit or scope of the disclosure. The number of bores 175 and their diameter may vary depending on the desired mechanical properties of the sealing assembly. For example, an increase in the number of bores 175 or increase in the diameter of the bores 175 causes a corresponding decrease in the thickness of the ring seal's internal sidewalls which will alter the mechanical characteristics of the seal, including increasing the seal's ability to deform. However, this increase in the number of bores or increase in the bores' 175 diameter may diminish the elastic recovery (rebound) of the seal 100 after compression and decompression. In a preferred embodiment, the bores 175 are cylindrical and have diameters of between 25% and 75% of the thickness of the ring seal. Diameters less than about 25% will significantly reduce the ring seal's ability to elastically deform. Meanwhile, increasing the diameter of the bores beyond about 75% of the thickness of the ring seal 100 will weaken the structural integrity of the seal 100, resulting in the seal 100 being compressed without substantial deformation of the sealing surfaces 120, 120' which may lead to leaks. In a preferred approach, the bores 175 have a diameter of approximately 50% of the thickness of the ring seal 100. Alternatively, the ring seal 100 could include a groove extending radially inward from the outer surface 165 to provide the deformability aspects discussed above.

Figure 5:
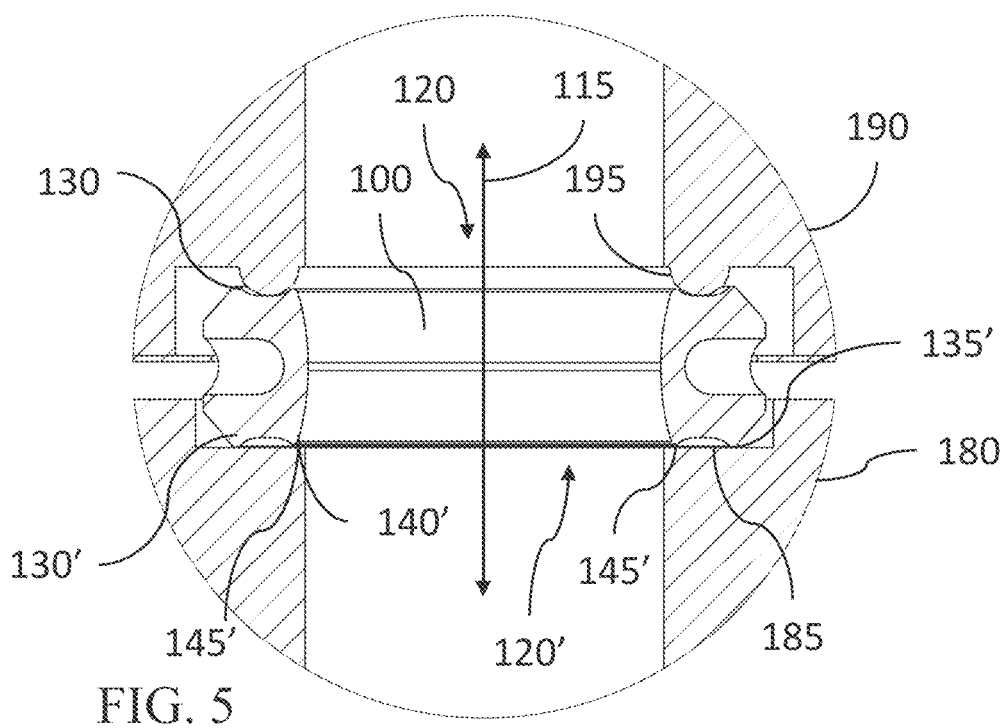
FIG. 5 is a cross-sectional view of the ring seal of FIG. 1 set between a C-type fluid flow component and a W-type fluid flow component prior to compression.
Figure 6:
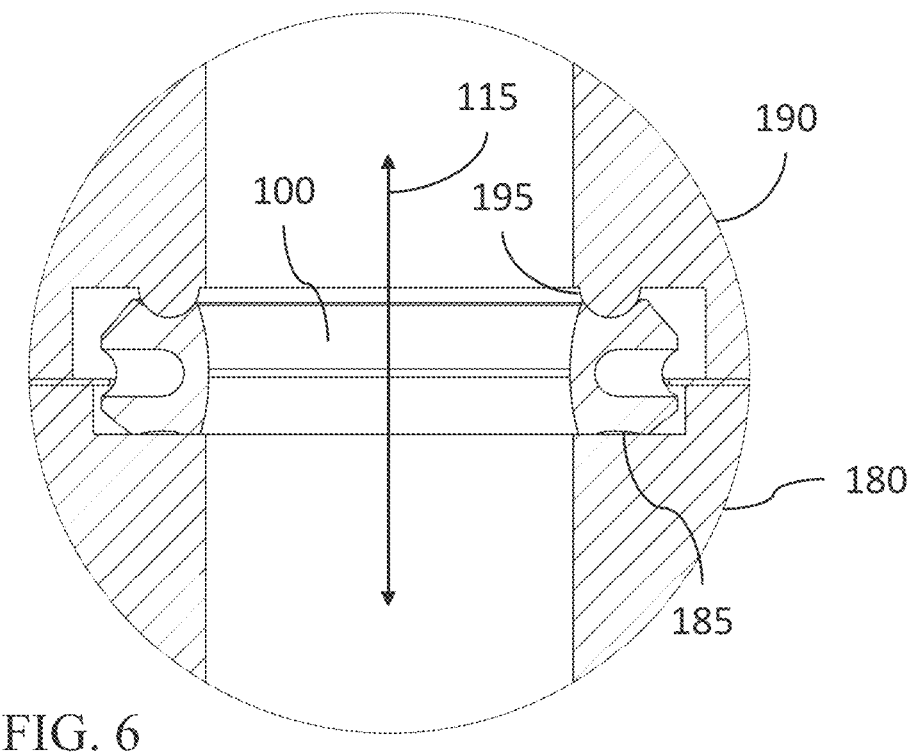
FIG. 6 is a cross-sectional view of the ring seal of FIG. 1 set between the fluid flow components of FIG. 5 after compression.

With reference now to FIGS. 5 and 6, the ring seal 100 is shown positioned between a C-type flow component 180 and a W-type flow component 190. The C-type flow component 180 includes a C-type port interface including a planar sealing surface 185. The W-type flow component 190 includes a W-type port interface including a sealing protrusion 195.

As shown in FIG. 5, the ring seal 100 is positioned between the flow components 180, 190 with the ring seal 100 in an uncompressed state. Force may then be applied to bring the flow components 180, 190 together to fluidically seal the flow components 180, 190 together. This causes the ring seal 100 to enter a compressed state as shown in FIG. 6. As shown, the first apex 135' of the second sealing side 120' engages the C-type flow component 180, and the first sealing surface 120 engages the W-type flow component 190. As the planar surface 185 of the C-type flow component 180 compresses the first sealing side 120', the first apex 135' of the first deformable annular extension 130' deforms against the planar surface 185, forming a fluid tight seal therebetween. During compression the planar surface 185 additionally engages and compresses against the second apex 145' of the second deformable annular protrusion 140' such that this additional portion deforms against the planar surface 185 to form an additional seal. As the sealing protrusion 195 of the W-type flow component 190 engages the first trough 150 of the first sealing side 120, the trough 150, trough's base 152, the first rising surface 154, and/or the second rising surface 156 then deform against the W-type port's sealing protrusion 195 to receive the sealing protrusion 195 and form a fluid tight seal therebetween. After compression of the ring seal 100, the flow components 180, 190 are fluidically sealed such that fluid may be passed between flow component 180 and 190 via the ring seal 100 without leaking fluid.

Thus, the identical sealing sides 120, 120' of the ring seal 100 may each be used to form a fluid tight seal with either a C-type flow component or a W-type flow component. Because the sealing sides 120, 120' are identical and the ring seal 100 is symmetrical about the radial plane, the ring seal 100 can be used to seal C-type, W-type, or a combination of flow components together without regard to the orientation of the ring seal 100. For instance, the ring seal 100 may be similarly used where the lower flow component is W-type flow component 190 and the upper flow component is a C-type flow component 180, where both the upper flow component and the lower flow component are both C-type flow components 180, or where both the upper flow component and the lower flow component are both W-type flow components 190. The illustrated ring seal 100 is thus orientation agnostic. Where the ring seal 100 is used to connect two C-type flow components 180 or two W-type flow components 190, the depth of the port design may be adjusted (e.g., increased) to accommodate the thickness of the ring seal 100 so that the ring seal 100 is compressed properly to form a fluid tight seal and not over or under compressed. Similarly, the seal's length in the axial direction could be adapted during manufacture to accommodate depth characteristics for C-type or W-type ports in which the seal may be used.

In all embodiments, the annular protrusions 130 and 140 are deformable and, upon forcible engagement with a planar sealing surface of a C-type flow component, deforms to form a fluid tight seal. Likewise, in all embodiments, one or more surfaces are positioned and sized to receive the seal ring of a W-type flow component to form a fluid tight seal.

It should further be appreciated that in some forms, only one sealing surface is compatible with multiple seal types (e.g., C-type or W-type) while the other sealing surface is only configured to form a seal of a single type (e.g., a prior art sealing surface).

While this disclosure has been described with respect to various specific examples, it is to be understood that various modifications may be made without departing from the scope thereof. Therefore, the above description should not be construed as limiting the disclosure but merely as an exemplification of preferred embodiments thereof and that the disclosure can be variously practiced within the scope of the following claims.

What is claimed is:

1. A metallic ring seal comprising:
    an annular body defining an axial hole therethrough for fluid passage in an axial direction, the annular body having a radial plane perpendicular to the axial direction and having: a radial outer face with a generally C-shaped cross section groove, a plurality of bores disposed therein, or both the generally C-shaped cross section groove and the plurality of bores;
    a first sealing side on a first axial end of the annular body, the first sealing side including:
        a first deformable annular protrusion extending from the annular body in the axial direction to a first apex, the first deformable annular protrusion configured to deform upon engagement with a first planar sealing surface, a second deformable annular protrusion extending from the annular body in the axial direction to a second apex, the second deformable annular protrusion configured to deform upon engagement with the first planar sealing surface, a first trough defined between the first deformable annular protrusion and the second deformable annular protrusion, the first trough extending annularly around the first sealing side, the first trough including an annular trough base, a first outer rising surface, and a first inner rising surface, the first outer rising surface extending radially outward from the trough base to one of the first apex and the second apex, the first inner rising surface extending radially inward from the trough base to the other of the first apex and the second apex, and the first trough configured to engage with a first annular rounded sealing protrusion;

wherein the first inner rising surface and the first outer rising surface are curved in cross section;

wherein a distance between the first apex and the second apex is between 0.023 inches and 0.043 inches, and wherein the first trough has a maximum depth below the first deformable annular protrusion of between 0.003 and 0.008 inches.

2. The ring seal of claim 1, further comprising:
a second sealing side on a second axial end of the annular body opposite the first axial end, the second sealing side including:
    a third deformable annular protrusion extending from the annular body in the axial direction to a third apex, the third deformable annular protrusion configured to deform upon engagement with a second planar sealing surface,
    a fourth deformable annular protrusion extending from the annular body in the axial direction to a fourth apex, the second deformable annular protrusion configured to deform upon engagement with the second planar sealing surface,
    a second trough defined between the third deformable annular protrusion and the fourth deformable annular protrusion, the second trough extending around the second sealing side and configured to engage with a second annular rounded sealing ring.

3. The ring seal of claim 2, wherein the second sealing side is a mirror image of the first sealing side reflected over the radial plane of the annular body perpendicular to the axial direction.

4. The ring seal of claim 1, wherein the first deformable annular protrusion and the second deformable annular protrusion are configured to deform to form a C-seal upon engagement with the first planar sealing surface.

5. The ring seal of claim 1, wherein the first trough is configured to engage the first annular rounded sealing ring to form a W-seal.

6. The ring seal of claim 1, wherein:
the first apex transitions to an outer extension surface extending radially away from the axial hole and the first outer rising surface extending radially towards the axial hole;
a first angle defined by the first outer rising surface adjacent to the first apex and the axial direction is between 20-60 degrees; and a second angle defined by the outer extension surface adjacent to the first apex and the axial direction is between 20-60 degrees.

7. The ring seal of claim 1, wherein the second deformable annular protrusion borders the axial hole such that an inner diameter surface defining a portion of the axial hole forms one side of the second deformable annular protrusion.

8. The ring seal of claim 1, wherein the first apex extends in the axial direction farther than the second apex.

9. The ring seal of claim 8, wherein the first apex extends in the axial direction farther than the second apex by about 0.002 to 0.004 inches.

10. The ring seal of claim 1, wherein the first trough has a diameter as measured from a point equidistant between the first apex and the second apex between 0.216 and 0.234 inches.

11. The ring seal of claim 1, wherein the first outer rising surface is curved from the trough base to the first apex, wherein the first inner rising surface is curved from the trough base to the second apex.

12. The ring seal of claim 1, wherein the first apex is radially outward of the second apex, wherein the first apex extends in the axial direction farther than the second apex.

13. A metallic ring seal comprising:
an annular body defining an axial hole therethrough for fluid passage in an axial direction, the annular body having a radial plane perpendicular to the axial direction and having: a radial outer face with a generally C-shaped cross section groove, a plurality of bores disposed therein, or both the generally C-shaped cross section groove and the plurality of bores;
a first sealing side on a first axial end of the annular body, the first sealing side including:
    a first deformable annular protrusion extending from the annular body in the axial direction to a first apex, the first deformable annular protrusion configured to deform upon engagement with a first planar sealing surface,
    a second deformable annular protrusion extending from the annular body in the axial direction to a second apex, the second deformable annular protrusion configured to deform upon engagement with the first planar sealing surface,
    a first trough defined between the first deformable annular protrusion and the second deformable annular protrusion, the first trough extending around the first sealing side and configured to engage with a first annular rounded sealing protrusion, the first trough including an annular trough base, a first outer rising surface, and a first inner rising surface, the first outer rising surface extending radially outward from the trough base to one of the first apex and the second apex, the first inner rising surface extending radially inward from the trough base to the other of the first apex and the second apex, wherein the first inner rising surface and the first outer rising surface are curved in cross section,
    wherein a distance between the first apex and the second apex is substantially larger than a maximum depth of the first trough below the first deformable annular protrusion, the distance between the first apex and the second apex and the depth of the first trough permitting the first annular rounded sealing protrusion to be received between the first apex and the second apex and against the trough to deform the trough against the first annular rounded sealing protrusion to form a fluid tight seal with the first annular rounded sealing protrusion.

14. The ring seal of claim 13, wherein the first apex extends in the axial direction farther than the second apex by about 0.002 to 0.004 inches.

15. The ring seal of claim 13, further comprising:
a second sealing side on a second axial end of the annular body opposite the first axial end, the second sealing side including:
  a third deformable annular protrusion extending from the annular body in the axial direction to a third apex, the third deformable annular protrusion configured to deform upon engagement with a second planar sealing surface,
  a fourth deformable annular protrusion extending from the annular body in the axial direction to a fourth apex, the second deformable annular protrusion configured to deform upon engagement with the second planar sealing surface,
  a second trough defined between the third deformable annular protrusion and the fourth deformable annular protrusion, the second trough extending around the second sealing side and configured to engage with a second annular rounded sealing ring.

16. The ring seal of claim 15, wherein the second sealing side is a mirror image of the first sealing side reflected over the radial plane of the annular body perpendicular to the axial direction.

17. The ring seal of claim 13, wherein the first deformable annular protrusion and the second deformable annular protrusion are configured to deform to form a C-seal upon engagement with the first planar sealing surface.

18. The ring seal of claim 13, wherein the first trough is configured to engage the first annular rounded sealing ring to form a W-seal.

19. The ring seal of claim 13, wherein:
the first apex transitions to an outer extension surface extending radially away from the axial hole and the first outer rising surface extending radially towards the axial hole;
a first angle defined by the first outer rising surface adjacent to the first apex and the axial direction is between 20-60 degrees; and
a second angle defined by the outer extension surface adjacent to the first apex and the axial direction is between 20-60 degrees.

20. The ring seal of claim 13, wherein the second deformable annular protrusion borders the axial hole such that an inner diameter surface defining a portion of the axial hole forms one side of the second deformable annular protrusion.

* * * * *